(12) United States Patent
Valisko

(10) Patent No.: US 6,189,318 B1
(45) Date of Patent: Feb. 20, 2001

(54) INTERNAL COMBUSTION ENGINES

(75) Inventor: Steven Valisko, Lantau Island (HK)

(73) Assignee: Gentech Design Limited, Queensway (HK)

(*) Notice: Under 35 U.S.C. 154(b), the term of this patent shall be extended for 0 days.

(21) Appl. No.: 09/101,970

(22) PCT Filed: Jan. 24, 1997

(86) PCT No.: PCT/GB97/00231

§ 371 Date: Jul. 30, 1998

§ 102(e) Date: Jul. 30, 1998

(87) PCT Pub. No.: WO97/28360

PCT Pub. Date: Aug. 7, 1997

(30) Foreign Application Priority Data

Jan. 30, 1996 (GB) .................................................. 9601813

(51) Int. Cl.[7] .................................................. F02B 35/00
(52) U.S. Cl. .............................. 60/315; 60/280; 60/316; 123/559.1
(58) Field of Search ....................... 60/315, 316, 317, 60/280; 123/559.1

(56) References Cited

U.S. PATENT DOCUMENTS

| | | | |
|---|---|---|---|
| 937,653 | * 10/1909 | Sickenberger | 60/315 |
| 1,004,564 | * 10/1911 | Gaskill | 60/315 |
| 1,501,041 | * 7/1924 | Cutler | 123/90.16 |
| 1,586,778 | 6/1926 | Brown . | |
| 1,632,896 | 6/1927 | Herr . | |
| 1,730,117 | 10/1929 | Brownrigg . | |
| 2,023,403 | * 10/1935 | Butler | 60/315 |
| 2,047,928 | * 7/1936 | Haring | 60/315 |
| 2,154,322 | 4/1939 | Kammermann . | |

FOREIGN PATENT DOCUMENTS

| | | |
|---|---|---|
| 59086 | 9/1982 | (EP) . |
| 546256 | 11/1922 | (FR) . |
| 584705 | 2/1925 | (FR) . |
| 658891 | 6/1929 | (FR) . |
| 856208 | 6/1940 | (FR) . |
| 1534 | 1/1911 | (GB) . |
| 491016 | 8/1938 | (GB) . |
| 501471 | 3/1939 | (GB) . |

* cited by examiner

Primary Examiner—Thomas Denion
Assistant Examiner—Binh Tran
(74) Attorney, Agent, or Firm—Jacobson, Price, Holman & Stern, PLLC

(57) ABSTRACT

An internal combustion engine is provided with a vacuum pump (17) to remove burnt gases form the engine cylinders during an exhaust stroke. The vacuum applied by the pump (17) is sufficient to remove the gases during an exhaust stroke and also apply a force to lift the piston. A certain amount of torque is therefore generated during the exhaust strokes. In a similar manner and to similar effect a compressor (18) is provided to force fuel into the cylinders during induction strokes and also create a certain amount of positive torque.

4 Claims, 1 Drawing Sheet

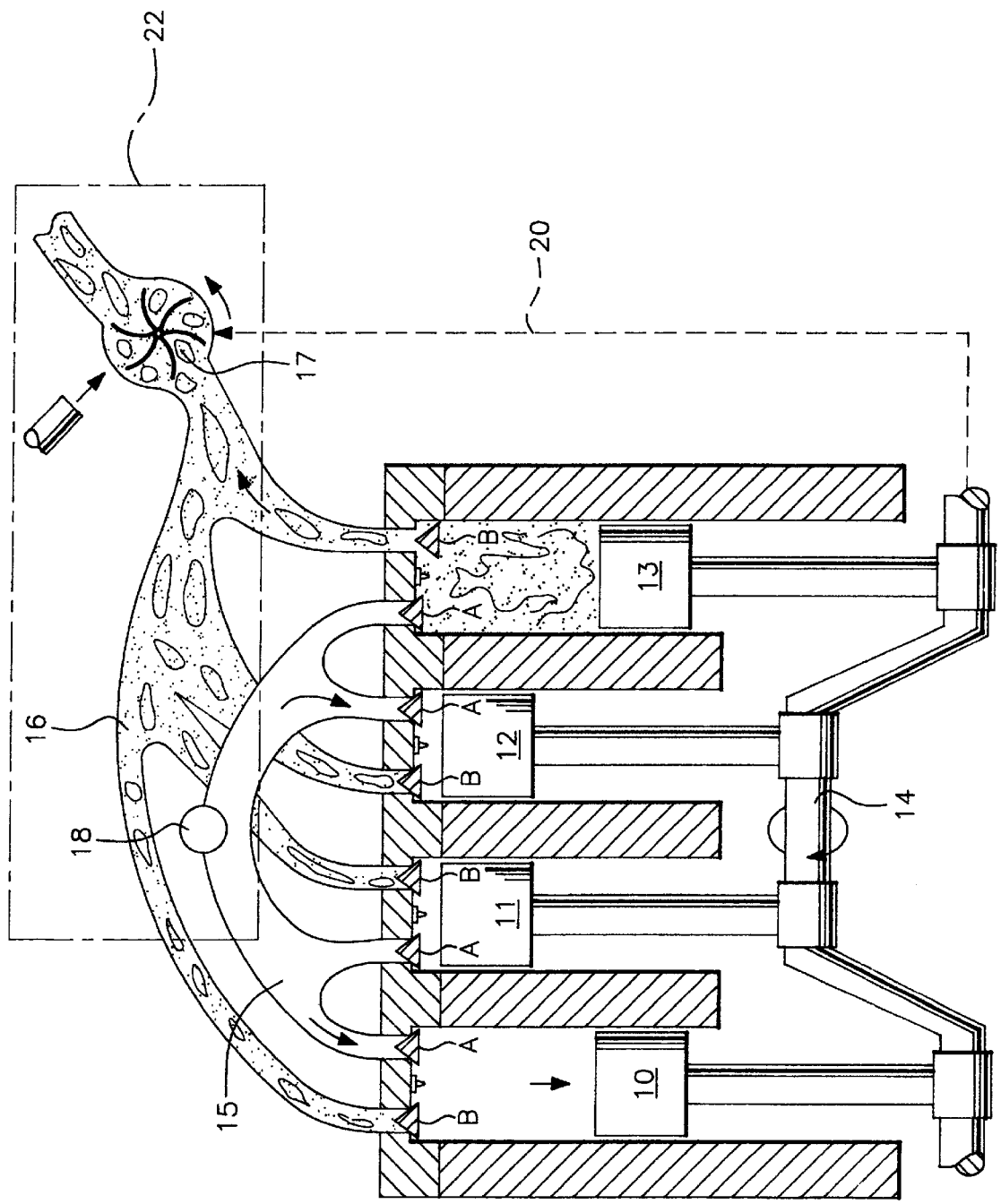

INTERNAL COMBUSTION ENGINES

BACKGROUND OF THE INVENTION AND RELATED ART

The invention relates to internal combustion engines. The invention relates more particularly to the control of exhaust gases in such engines. In normal operation of a reciprocating internal combustion engine the exhaust gases are removed, after each compression stroke, by the sweep of a piston, during an exhaust stroke, through a cylinder to force burnt gases into an exhaust manifold and towards an exhsaust pipe.

U.S. Pat. No. 1,586,778 discloses a four stroke reciprocating piston internal combustion engine (7) having several cyliners with inlet and exhaust valves adjacent tops of the respective cylinders and an exhaust chamber (6) for collecting exhaust gases produced by the engine in use, said engine including a vacuum pump (B) for the exhaust chamber arranged to supply a vacuum to each cylinder when its exhaust valve is open to withdraw exhaust gases out of the cylinder. Vacuum is applied to the exhaust chamber to suck exhaust gases out of the cylinder, the piston is also positively sucked towards the top of the cylinder so that each exhaust stroke is also a power stroke.

To ensure an efficient scavenge, to remove as much of the burnt cases as possible, certain fairly significant overlaps between the opening and closing of inlet and exhaust valves in a top of the cylinder is necessary. Also, the scavenging stroke absorbs a certain amount of mechanical energy to reverse the forces applied to the piston tending at least to unbalance the engine.

It is an object of the invention to overcome or reduce these problems.

BRIEF SUMMARY OF THE INVENTION

According to the invention there is provided a reciprocating four-stroke internal combustion engine having one or more cylinders with inlet and outlet valves adjacent ends of respective cylinders and an exhaust chamber for collecting exhaust gases produced by the engine in use, including a vacuum pump for the exhaust chamber and a compressor for supplying fuel-air mixture to each cylinder, the vacuum pump being arranged to apply a vacuum to each cylinder when its exhaust valve is open to withdraw exhaust gases out of the cylinder and positively suck the piston of that cylinder towards the end of the cylinder, so that each exhaust stroke of the engine is also a power stroke, in which the compressor is arranged to apply pressure so that a fuel-air mixture is supplied to each cylinder under sufficient pressure when its inlet valve is open that each induction stroke is also a power stroke, and in which the valves are arranged to open and close without valve-overlap.

The vacuum pump is preferably mechanically connected to be driven by the engine.

The vacuum pump and compressor are preferably mounted in the same housing.

The compressor is preferably driven at a rate automatically varied by the operating speed of the engine.

The invention also provides an exhaust manifold vacuum pump for an internal combustion engine which is arranged to be driven by the engine and apply a vacuum to the or each cylinder of the engine whenever a respective exhaust valve is open at sufficient pressure to positively suck the piston of that cylinder towards the top of the cylinder, so that each exhaust stroke of the engine is also a power stroke.

A mechanical drive may also be provided connecting the engine to the pump arranged to operate the pump at a rate corresponding to the operating speed of the engine.

An internal combustion engine having an exhaust system arrangement according to the invention will now be described by way of example with reference to the accompanying schematic diagram.

DETAILED DESCRIPTION OF THE INVENTION

Referring to the drawing, a four cylinder reciprocating internal combustion engine has four pistons 10, 11, 12 and 13 mechanically connected in conventional manner to a crank shaft 14 Each cylinder of the engine has an inlet valve A and an outlet valve B. The inlet valves are connected to receive fuel-air mixture supplied from a fuel injector (not shown) via an inlet manifold 15 and each outlet valve communicates with an exhaust manifold 16. Generally stated the engine described so far is totally conventional and well-known.

In embodiments of the invention, the engine includes an exhaust manifold vacuum pump 17 mounted to create a vacuum in the exhaust manifold. The pump 17 is connected and driven by toothed-belt (not shown) coupled to the crank shaft 14 as indicated by dashed or hidden line 20. Other arrangements may be provided for driving the pump 17, including an electric motor.

A compressor 18 is mounted to generate an increase in pressure inside the inlet manifold 15 so that fuel-air mixture is forced into the cylinders whenever the respective inlet valves A are open. This is similar to a so-called "supercharger" but the pressures applied in the described engine are generally higher, as will be explained later. The compressor 18 can be driven by a toothed belt from the crank shaft 14 or by any other convenient means.

In any event, in the described engine exhaust gases are sucked out each of the cylinders, making scavenging during exhaust strokes much more efficient, and it is not necessary for such or any significant valve overlaps such as are required in conventional engines. The sucking itself, by the pump 17, adds to or becomes partly power generating for the engine. Normally in an engine, an exhaust stroke is a non-power stroke, indeed it is a stroke in which some power of the engine is used or required to urge the burnt gases out of the cylinder. Further, this urging introduces forces on the piston in a reverse direction to the normal forces exerted during the immediately preceding power stroke. As such, the overall forces applied to on the engine are reversed leading to some extra vibration or engine unbalance. In other words, the pump 17 makes the removal of burnt gases more efficient, provides the engine with what is in effect an extra "power" stroke, and improves the mechanical balance of the engine. Without valve overlaps, the engine can be tuned to use its fuel supply more efficiently.

The engine also includes the compressor 18 which is also acting to improve the performance of the engine. During the induction strokes of a normal engine, fuel-air mixture is drawn into each cylinder when its inlet valve is open by vacuums created by the pistons. In order to create the required vacuums, the pistons are acted upon by forces tending to decelerate the pistons, so the induction strokes are also a power using strokes.

With a normal supercharger, the fuel mixture is forced into the cylinders at least to some extent. In the described arrangement, the pressure provided by the compressor 18 is such that the pistons are actually forced down as and by the fuel-air mixture entering each cylinder in turn. This means that the induction strokes become in effect also extra "power" strokes. As a result, the described engine has main power stroke, and two extra power strokes which correspond to the exhaust stroke and the induction strokes. The only strokes which are not generating power, or at least providing some positive torque and therefore power, are the compression strokes.

It may be preferably to incorporate simple one way valves at least in the induction chamber adjacent each cylinder head to prevent a reverse flow of gases occurring.

Certain consequential modifications are required for any engine fitted with the pumps 17 and the compressor 18. The valve timings must be changed to take advantage of the improved gas flows and pressure differentials. Indeed there is effectively no need for valve overlap if the fuel is forced in and the exhaust gases are sucked out as soon as required by the actual position of the pistons. In present engines overlap is required because time must be allowed for charging the cylinder with fuel and for removing the burnt gases even though the piston has moved away from its dead centres for next respective strokes in an engine cycle.

It will be noted that as the valves need not be open when the gases are expanding in the cylinders, the engine will tend to produce much less noise.

Also, piston rings are normally designed to resist especially gases passing the side of the piston into an engine sump, for example. In the described engine, there are times when the pressure above the pistons could fall below atmospheric pressure. It is therefore required that the piston rings are arranged to prevent gases escaping from the sump into the cylinders above the pistons.

The pump 17 and compressor 18 may be mounted in a same housing as indicated by phantom line 22 and driven by the same toothed belt (not shown) although it may be required to drive the pump 17 and the compressor at effectively different speeds and therefore use a suitable gearbox, for example. In any event, housing the pump 17 and compressor together provides inherent inter-cooling and also makes better use of generated heat.

It is envisaged that the described engine will have a generally lower compression ratio than comparable known engines and operate on or low octane fuels including fuel gases and alcohols, and embodiments of the invention can be provided that operate on diesel fuel. The described engine block may be cast in one piece that is with a cylinder head integrally formed with the rest of the engine block. It is also envisaged that the valves will be less susceptible to wear and burning because the actual forced gas flows, created by the pump 17 and compressor 18, will lead itself to more satisfactory cooling of the valves.

What is claimed is:

1. A reciprocating four-stroke internal combustion engine having one or more cylinders with inlet and outlet valves adjacent ends of respective cylinders and an exhaust chamber for collecting exhaust gases produced by the engine in use, including a vacuum pump for the exhaust chamber and a compressor for supplying fuel-air mixture to each cylinder, the vacuum pump being arranged to apply a vacuum to each cylinder when its exhaust valve is open to withdraw exhaust gases out of the cylinder and positively suck the piston of the cylinder towards the end of the cylinder, so that each exhaust stroke of the engine is also a power stroke, the compressor being arranged to apply pressure so that a fuel-air mixture is supplied to each cylinder under sufficient pressure when its inlet valve is open that each induction stroke is also a power stroke, and in which the valves are arranged to open and close without valve-overlap.

2. The engine according to claim 1, wherein the vacuum pump is mechanically connected to be driven by the engine.

3. The engine according to claim 1, wherein the vacuum pump and compressor are mounted in a same housing.

4. The engine according to claim 1, wherein the compressor is driven at a rate automatically varied by the operating speed of the engine.

* * * * *